(12) United States Patent
Kobayashi (10) Patent No.: US 7,504,056 B2
(45) Date of Patent: Mar. 17, 2009

(54) EXTRUSION MOLDING SYSTEM AND METHOD

(75) Inventor: Takayuki Kobayashi, Chiba (JP)

(73) Assignee: Kinugawa Rubber Ind. Co., Ltd., Chiba-shi (JP)

( * ) Notice: Subject to any disclaimer, the term of this patent is extended or adjusted under 35 U.S.C. 154(b) by 410 days.

(21) Appl. No.: 10/809,794

(22) Filed: Mar. 26, 2004

(65) Prior Publication Data
US 2004/0247731 A1  Dec. 9, 2004

(30) Foreign Application Priority Data
Mar. 28, 2003 (JP) .............................. 2003-089543

(51) Int. Cl.
B29C 47/00 (2006.01)
D01D 5/20 (2006.01)
A01J 21/02 (2006.01)

(52) U.S. Cl. ............... 264/177.16; 264/40.1; 264/40.7; 264/167; 264/169; 264/177.1; 264/209.8; 425/380; 425/381; 425/382.3; 425/382.4

(58) Field of Classification Search ........... 264/177.16, 264/209.8; 425/382.4
See application file for complete search history.

(56) References Cited

U.S. PATENT DOCUMENTS

| | | | | |
|---|---|---|---|---|
| 3,928,519 A | * | 12/1975 | Kashiyama et al. | 264/40.7 |
| 5,108,526 A | * | 4/1992 | Cornils et al. | 156/108 |
| 5,112,547 A | * | 5/1992 | Nakashima et al. | 264/167 |
| 5,122,315 A | * | 6/1992 | Darley | 264/40.1 |
| 5,156,781 A | | 10/1992 | Böhm et al. | |
| 5,162,090 A | * | 11/1992 | Arima | 264/167 |
| 5,167,893 A | * | 12/1992 | Yada et al. | 264/167 |
| 5,447,670 A | * | 9/1995 | Ito et al. | 264/146 |
| 5,486,325 A | * | 1/1996 | Arima | 264/167 |
| 5,489,409 A | * | 2/1996 | Koganezawa et al. | 264/167 |
| 5,507,992 A | * | 4/1996 | Yada et al. | 264/167 |
| 5,529,650 A | * | 6/1996 | Bowers et al. | 156/64 |
| 5,662,851 A | * | 9/1997 | Yada et al. | 264/167 |
| 5,679,303 A | * | 10/1997 | Hayashi et al. | 264/167 |
| 5,725,814 A | * | 3/1998 | Harris | 264/40.3 |
| 5,792,405 A | * | 8/1998 | Tsuchida et al. | 264/146 |
| 5,951,930 A | * | 9/1999 | Takemori et al. | 264/167 |
| 6,468,067 B1 | | 10/2002 | Ikegami | |

FOREIGN PATENT DOCUMENTS

| | | | |
|---|---|---|---|
| JP | 04338523 | * | 11/1992 |
| JP | 5-138714 A | | 6/1993 |
| JP | 6-71730 A | | 3/1994 |
| JP | 6-55415 B2 | | 7/1994 |
| JP | 3268804 B2 | | 1/2002 |
| JP | 2002-178392 A | | 6/2002 |
| JP | 3330126 B2 | | 7/2002 |

* cited by examiner

Primary Examiner—Monica A Huson
Assistant Examiner—Jeff Wollschlager
(74) Attorney, Agent, or Firm—Foley & Lardner LLP (57) ABSTRACT

An extrusion molding system includes a die having a first opening with a unvariable shape and a second opening with a variable shape, an extruder which feeds resin to the die, and a gear pump arranged between the die and the extruder. An ECU conducts a first sequence control to change the shape of the second opening and a second sequence control to change the rotation speed of the first gear pump in synchronism with a change in the shape of the second opening.

8 Claims, 8 Drawing Sheets

FIG.7A
(PRESENT INVENTION)

EXTRUSION MOLDING SYSTEM AND METHOD

BACKGROUND OF THE INVENTION

The present invention relates to an extrusion molding system and method.

When manufacturing a continuous extrusion with a sectional shape varying continuously along the length direction, such as automotive window molding, the variable section of the extrusion can be obtained by partly cutting an extruded work with a predetermined sectional shape by a cutter, the cutter being successively moved by an actuator to change a cutting position of the work.

With this method, since the rotation speed of a screw of an extruder is maintained constant, the discharge amount of resin can be controlled easily, providing moldings with high accuracy in a stable way. However, chips are produced in quantity, leading to an increase in material cost.

One solution is proposed in JP-A 6-71730 wherein an extrusion molding system comprises a shape changing plate arranged at an opening of a die to change the shape thereof, an actuator connected to the plate for reciprocation thereof, and an extruder having screw rotation speed sequence-controlled in accordance with change in sectional shape of the opening due to movement of the plate so as to change the discharge amount of resin.

Another solution is proposed in JP-B2 6-55415 wherein an extrusion molding system comprises a gear pump arranged between a die and an extruder, a pressure sensor arranged prior to the gear pump, and extruder having screw rotation speed feedback-controlled so that the pressure indicated by the pressure sensor becomes equal to a set pressure.

However, with the solution of JP-A 6-71730, the change in discharge amount of resin does not adequately follow change in sectional shape of the die opening. And even with the screw rotation speed of the extruder varied, the discharge amount of resin is not changed linearly, resulting in difficult forming of moldings with larger rate of change. Moreover, even when the extruder rotates at constant speed, the accuracy of the discharge amount of resin varies ±3%. And when changing the rotation speed continuously, the ±3% accuracy is further lowered, resulting in no satisfaction of a desired value of accuracy.

With the solution of JP-B2 6-55415, it is gear pump and not extruder which finally feeds resin to the die, wherein the gear pump has a discharge amount of resin which is merely followed by the change in amount of resin fed from the extruder with low accuracy in terms of time and amount, and is not controlled along the time axis. With the method of conducting feedback control by detecting pressure variations, no problem occurs when the discharge amount of resin has a relatively small rate of change, such as at startup of the system and change in set conditions. However, when manufacturing automotive moldings with sectional shape varied within the range of a mere few hundred millimeters, an electronic control unit (ECU) cannot provide quick and sufficient calculations, causing possible occurrence of breakdown of the gear pump due to pressure increase or poor filling of resin due to pressure decrease, resulting in difficult achievement of a required rate of change of the discharge amount.

SUMMARY OF THE INVENTION

It is, therefore, an object of the present invention to provide an extrusion molding system and method, which is excellent not only in accuracy of the discharge amount of resin, but also in rate of change thereof.

The present invention provides generally an extrusion molding system, comprising: a die having a first opening with a unvariable shape and a second opening with a variable shape; an extruder which feeds a material to the die; a first gear pump arranged between the die and the extruder; and an electronic control unit (ECU) which controls the first gear pump, the ECU being programmed to conduct a first sequence control to change the shape of the second opening and a second sequence control to change a rotation speed of the first gear pump in synchronism with a change in the shape of the second opening.

A main feature of the present invention lies in providing a method of controlling an extrusion molding system which comprises a die having a first opening with a unvariable shape and a second opening with a variable shape, an extruder which feeds a material to the die, and a first gear pump arranged between the die and the extruder, the method comprising: conducting a first sequence control to change the shape of the second opening; and conducting a second sequence control to change a rotation speed of the first gear pump in synchronism with a change in the shape of the second opening.

BRIEF DESCRIPTION OF THE DRAWINGS

The other objects and features of the present invention will become apparent from the following description with reference to the accompanying drawings, wherein.

DETAILED DESCRIPTION OF THE INVENTION

Referring to the drawings, a description is made about an extrusion molding system and method embodying the present invention.

Figure 4:
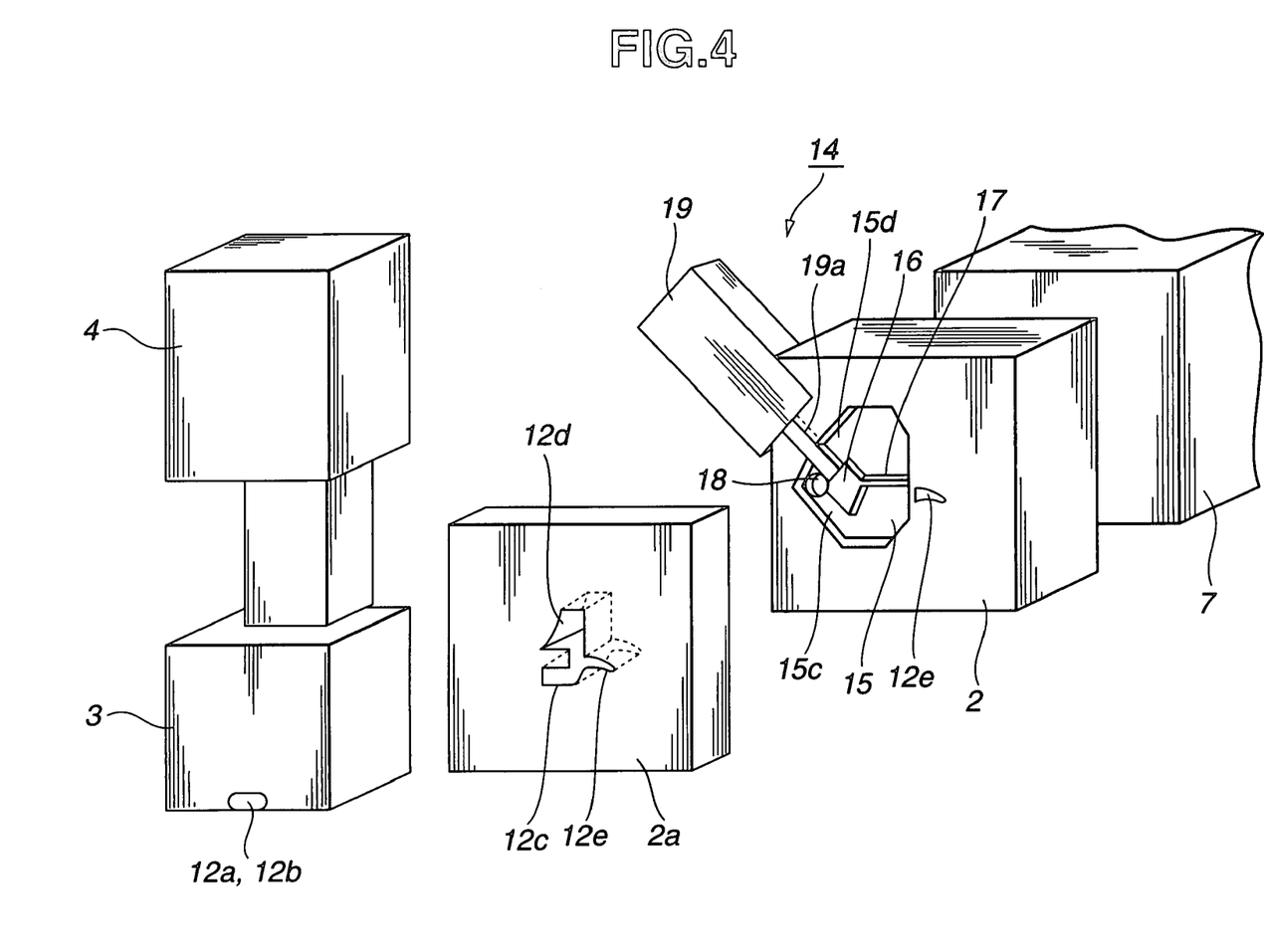
FIG. 4 is a view similar to FIG. 1, showing a valve mechanism.
Figure 5A:
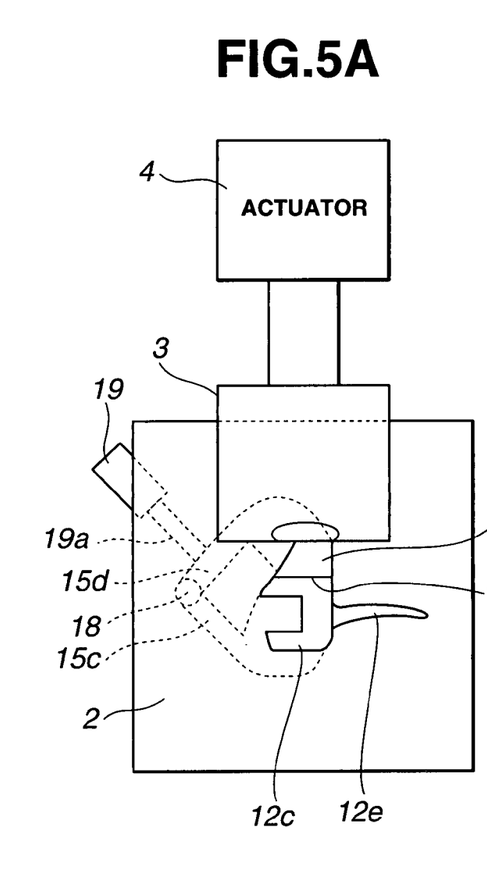
FIGS. 5A-5C are views similar to FIG. 3, explaining operation of the first embodiment.
Figure 5B:
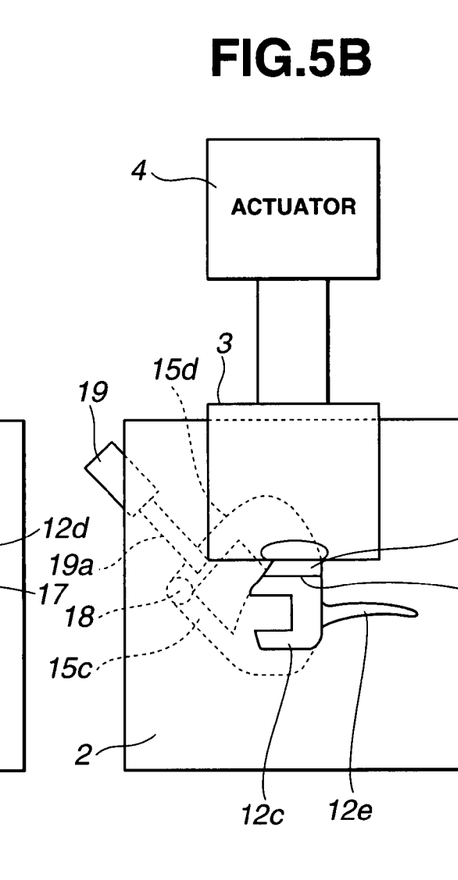
Figure 5C:
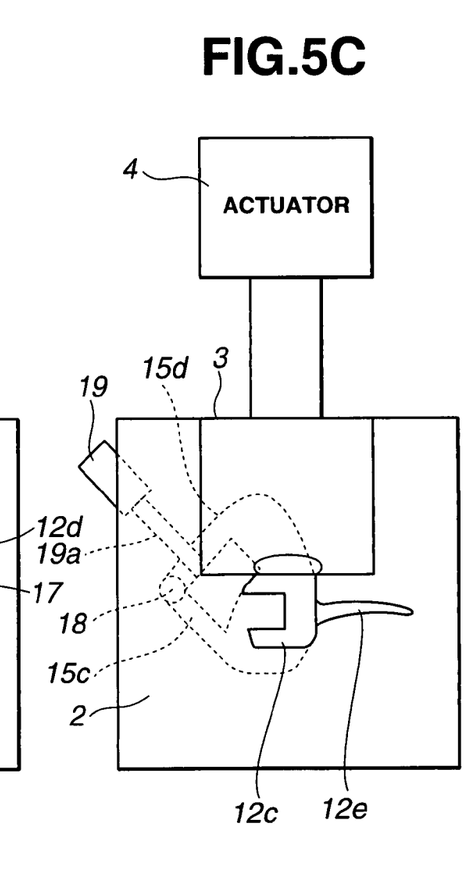
Figure 6:
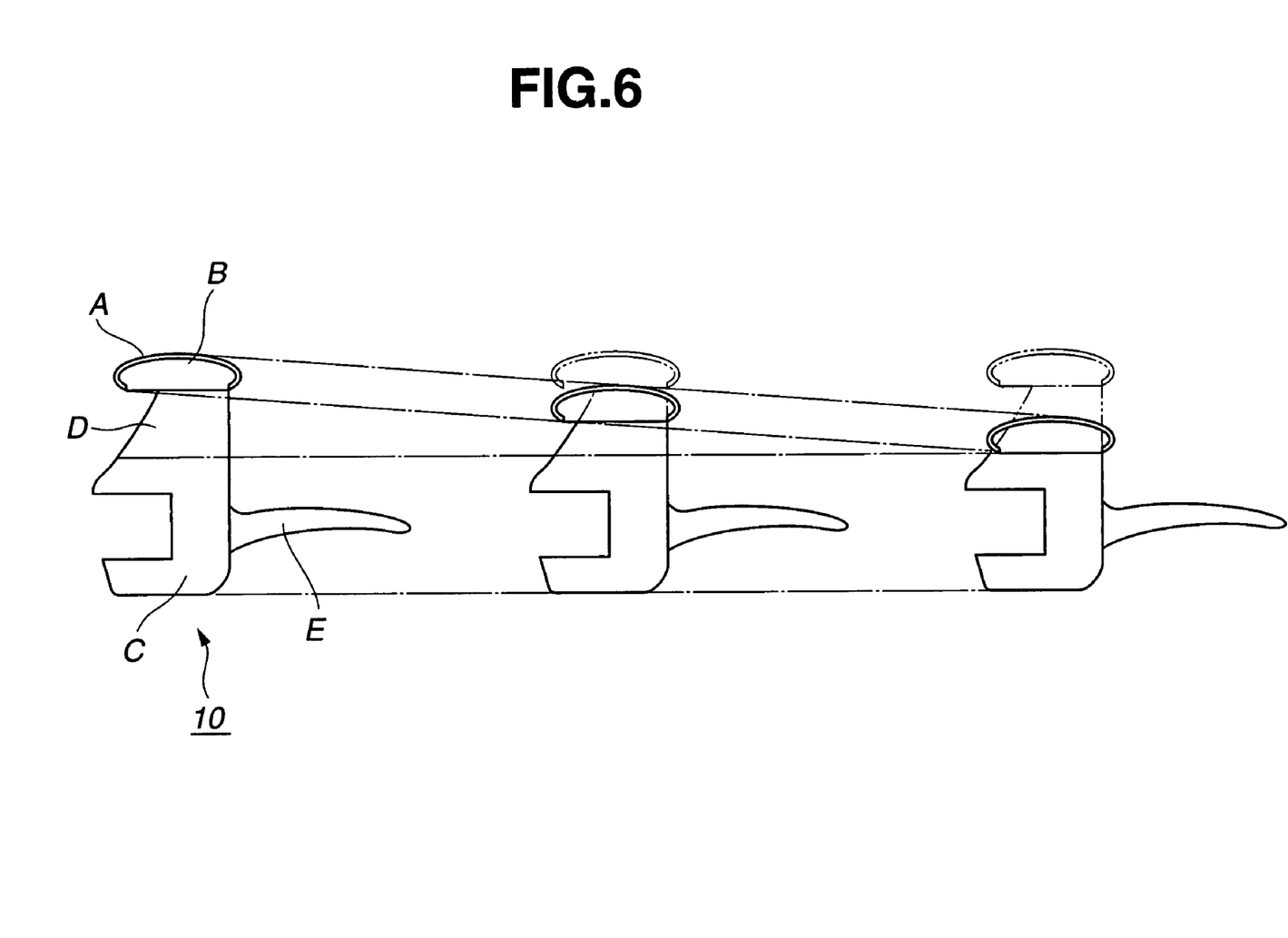
FIG. 6 is a schematic side view explaining the change in sectional shape of a window molding.

Referring to FIGS. 1-7B, there is shown a first embodiment of the present invention. Referring to FIG. 6, before describing an extrusion molding system, a window molding 10 is described. The window molding 10 has a sectional shape successively changed along the length direction. The window molding 10 comprises a design-part skin A, a design-part main body B, a glass opening C, a seal lip E, each having a given sectional shape along the length direction, and a water guide D having a sectional shape continuously changed along the length direction. The design-part skin A is formed of ionomer or ethylene-acrylic acid copolymer or thermoplastic elastomer of about D40-70 hardness such as TPO, SBC or the like. The design-part main body B, glass opening C, and water guide D are formed of thermoplastic elastomer of about A80-90 hardness such as TPO, SBC or the like. The seal lip E is formed of thermoplastic elastomer of about A50-70 hardness such as TPO, SBC or the like. Due to its corrosivity and low thermostability, PVC is rather unsuitable for application in the present invention using a gear pump.

Figure 3:
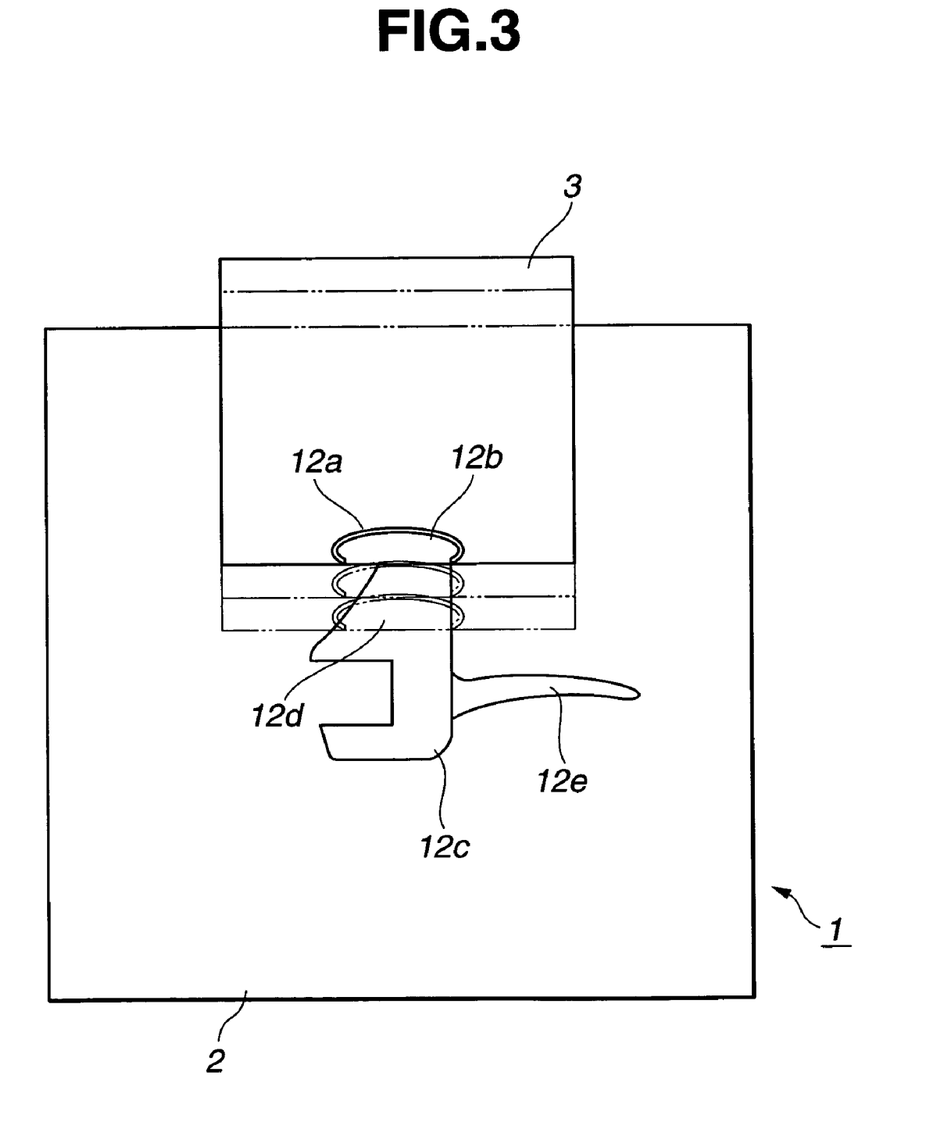
FIG. 3 is a schematic view showing a die.

Referring to FIG. 3, a description is made about a die 1 for forming the window molding shown in FIG. 6. The die 1 comprises a stationary die 2 and a movable die 3. The stationary die 2 has an opening (first opening) 12c for forming the glass opening C, an opening 12e for forming the seal lip E, and an opening (second opening) 12d for forming the water guide D. The movable die 3 has an opening 12a for forming the design-part skin A and an opening 12b for forming the design-part main body B. A thin partition, not shown, is arranged at a boundary between the adjacent openings. When driven vertically as viewed in FIG. 3 by sequence control, the movable die 3 increases or decreases a closed area of the top of the opening 12d of the stationary die 2, allowing continuous change in magnitude of the opening 12d. Thus, the window molding extruded from the openings 12a-12d defined by the stationary and movable dies 2, 3 has a sectional shape successively changed along the length direction.

As for the opening 12d having sectional shape varied along the length direction, the amount per unit time of resin or material to be supplied thereto should be changed continuously. Then, if resin is supplied to the opening 12d through an independent passage, the feed amount is continuously changed from 100% at full opening to 0% at full closing. As a result, even if a gear pump is arranged, the rotation speed of the gear pump becomes zero intermittently. This means that the shape of a work may cause a continuous full closed state, leading to possible degradation of resin due to stagnation thereof. Moreover, when starting the gear pump from a standstill, a greater load applied to the gear pump can make control unstable, or galling of the gears can occur. Thus, it is not desirable to stop the gear pump.

In view of the above, using the gear pump having a discharge amount changed, resin is coincidentally supplied to the opening 12c and the opening 12d. This reduces an area ratio of the maximum section of the opening 12d to the minimum section thereof, allowing a reduction in rate of change of the discharge amount. Moreover, resin is always supplied to the opening 12c, having no standstill of the gear pump.

Figure 1:
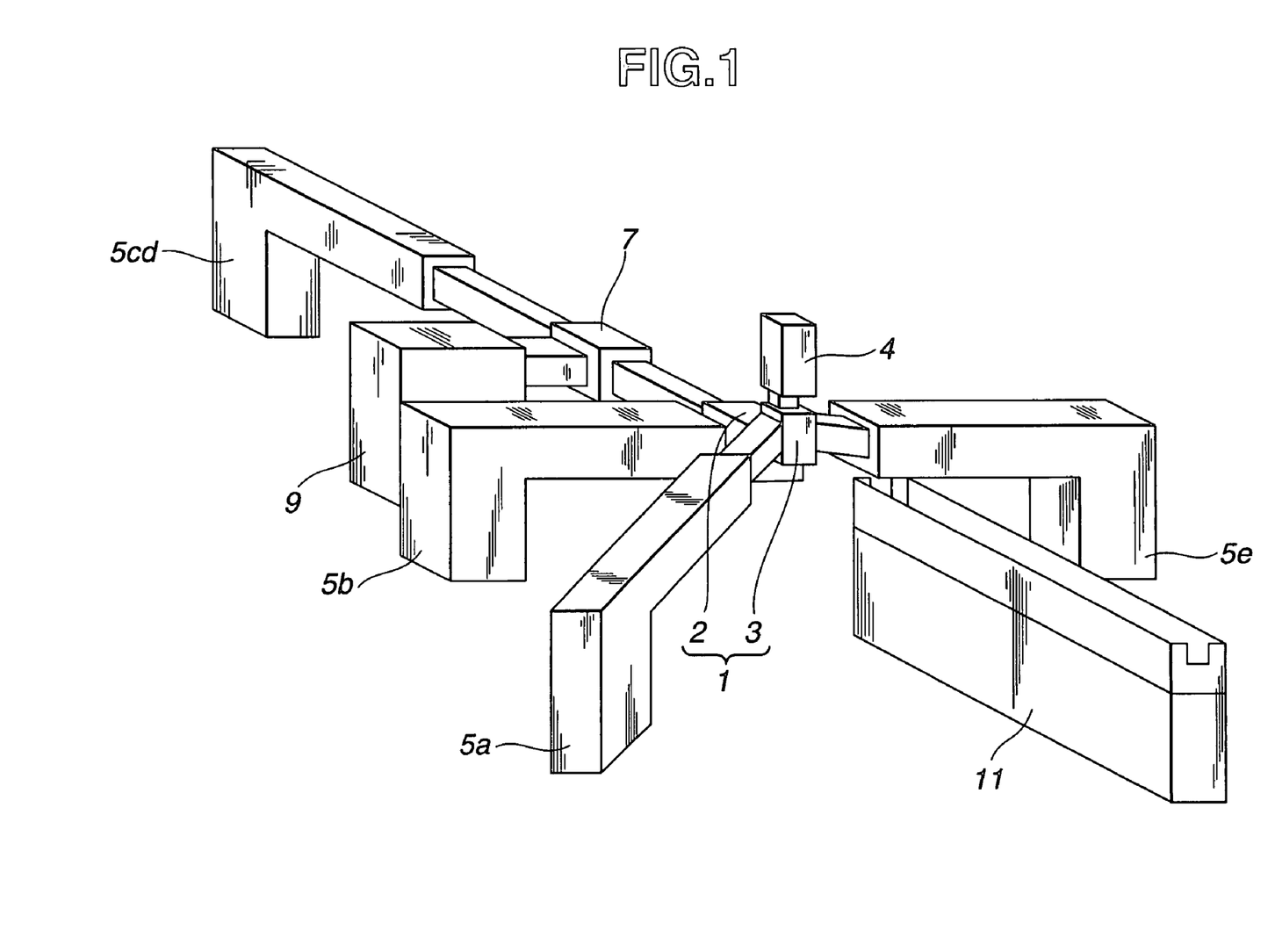
FIG. 1 is a perspective view showing a first embodiment of an extrusion molding system according to the present invention.

From the foregoing, the embodiment adopts a structure for coincidentally supplying resin to the openings 12c, 12d and changing the total amount of resin to be supplied thereto. Thus, the system is realized as shown in FIG. 1. Specifically, connected to the die 1 shown in FIG. 3 are extruders 5a, 5b, 5e for separately feeding resin to the openings 12a, 12b, 12e each having a unvariable sectional shape, and an extruder 5cd for coincidentally feeding resin to the opening 12c having a unvariable sectional shape and the opening 12d having a variable sectional shape. A cooling water tank 11 is arranged to cool down extruded moldings.

Figure 2:
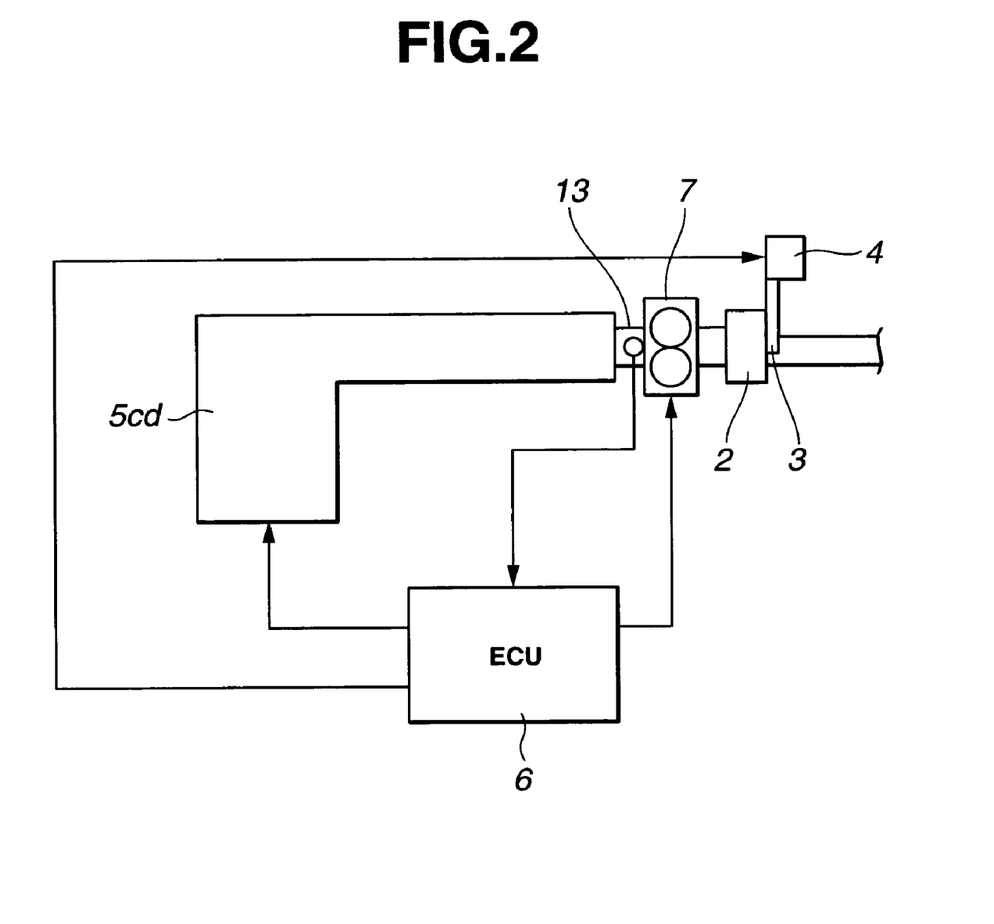
FIG. 2 is a block diagram showing an extruder and its control.

Referring to FIG. 2, there are shown the extruder 5cd and its control. As described above, the die 1 comprising stationary die 2 and movable die 3 is connected to the extruder 5cd. An actuator 4 is arranged to vertically drive the movable die 3. With such structure, a first sequence control is conducted to vertically move the movable die 3 so as to change the sectional area of the opening 12d.

Since the openings 12a-12c, 12e have unvariable sectional shapes, the given amounts of resin can be supplied thereto, whereas since the opening 12d has a variable sectional shape, the amount of resin to coincidentally be supplied to the openings 12c, 12d should be changed. For this purpose, a gear pump 7 is arranged between the die 1 and the extruder 5cd.

The gear pump 7 can compensate for a poor discharge accuracy of the extruder 5cd due to feed dispersion, slippage, pressure-discharge variations, and the like peculiar thereto. The gear pump 7 is very excellent in discharge accuracy, allowing achievement of the highly accurate shape of moldings. The gear pump 7 is higher than the extruder 5cd in proportionality between the rotation speed and the discharge amount. Thus, the gear pump 7 has a discharge amount immediately varied with change in rotation speed, providing very excellent accuracy and responsivity in the variation range, allowing achievement of the highly accurate shape of moldings. Moreover, this feature involves following of the discharge amount with respect to abrupt change in rotation speed, allowing diversification of the achievable molding shapes and thus manufacture of moldings having unprecedented design, performance, and function.

The system is also constructed to conduct a second sequence control for increasing/decreasing the feed amount of resin by changing the rotation speed of the gear pump 7 in synchronism with the magnitude of the sectional area of the openings 12c, 12d of the die 1, a third sequence control for increasing/decreasing the feed amount of resin by changing the rotation speed of the extruder 5cd in synchronism with that of the gear pump 7, and a feedback control for increasing/decreasing the rotation speed of the extruder 5cd so as to maintain roughly constant the pressure at the inlet of the gear pump 7 in accordance with the magnitude of the pressure at the inlet thereof.

Referring to FIG. 2, in order to allow the second sequence control, the gear pump 7 is connected to an electronic control unit (ECU) 6. The gear pump 7 is higher than the extruder 5cd in proportionality and responsivity of the change in rotation speed and discharge amount with respect to the change in magnitude of the sectional area of the openings 12c, 12d, allowing higher feed accuracy and the following with respect to abrupt feed change of resin. Referring to FIG. 1, a motor 9 is arranged to drive the gear pump 7. The motor 9 includes an inverter motor, preferably, an AC servomotor. When attaching importance to the excellence of the responsivity and rate of change, it is preferable to adopt a motor having capacity more than three times as large as that of a typical motor used for maintaining the discharge amount constant.

With the third sequence control, the timing of starting/stopping the change in rotation speed of a screw of the extruder 5cd corresponds to that of starting/stopping the change in rotation speed of the gear pump 7. Optionally, the timing may be advanced in accordance with the responsivity of the extruder 5cd. Although the responsivity of the extruder 5cd varies with its capacity, screw design, and head internal volume, if the timing of starting/stopping the change in screw rotation speed of the extruder 5cd is advanced within the range of about 0 to 0.5 sec, stable control can be achieved with less pressure variations at the inlet of the gear pump 7. Optionally, the length of advanced time may be changed between when increasing the rotation speed of the extruder 5cd and when decreasing the rotation speed thereof. It is noted that the timing should be adjusted in an adequate range, since if it is advanced more than necessary, the change in feed amount of resin of the extruder 5cd precedes that in rotation speed of the gear pump 7, leading to great pressure variations at the inlet of the gear pump 7.

Referring to FIG. 2, in order to allow the feedback control, a resin pressure gauge or pressure sensor 13 is arranged at the inlet of the gear pump 7. The resin pressure gauge 13 is connected to the ECU 6, so that the rotation speed of the extruder 5cd is feedback-controlled to maintain roughly constant the pressure at the inlet of the gear pump 7. Control of maintaining roughly constant the pressure at the inlet of the gear pump 7 is conducted to stabilize the filling factor of the gear pump 7 and protect the gear pump 7. Specifically, control is conducted to compensate for pressure variations produced such that the pressure at the inlet of the gear pump 7 is decreased with increasing the rotation speed of the gear pump 7, whereas the pressure is increased with decreasing the rotation speed. More specifically, a control parameter is fed back from the resin pressure gauge 13 to the extruder 5cd so that the extruder 5cd feeds an amount of resin corresponding to the discharge amount of the gear pump 7.

Feedback control is conducted by detecting pressure variations at the inlet of the gear pump 7 due to change in rotation speed of the gear pump 7, producing great time lag, resulting in difficult following of the rotation speed of the extruder 5cd when having greater rate of change of the sectional area of the opening 12d of the die 1. Thus, it is preferable to apply the third sequence control and the feedback control in combination. It is noted that the discharge amount of the extruder 5cd can disperse due to engagement of resin, pressure-discharge variations, and the like, producing excess or shortage of the feed amount of resin after several repetitions of change in the discharge amount, leading to unstable pressure.

In view of the above, referring to FIG. 4, in order to independently feed resin to the opening 12c and the opening 12d, a branch part 16 is arranged to divide a passage inside the stationary die 2 into two portions, and a valve mechanism or secondary flow-rate adjusting means 14 is arranged to allow relative adjustment of the flow rate in the passage portions, wherein the gear pump 7 serves as primary flow-rate adjusting means. A concave 15 having a given depth is formed in the stationary die 2, and the branch protrusion or branch part 16 and a partition 17 are formed roughly in the center of the concave 15. An introduction hole 18 is formed through the stationary die 2 at the position opposite to the partition 17 so as to introduce resin from the gear pump 7 to the concave 15. A cover 2a is attached to the stationary die 2 to conceal the concave 15. The cover 2a is formed with the openings 12c-12e shown in FIG. 3, so that when resin introduced into the concave 15 through the introduction hole 18 flows to a passage 15d above the branch protrusion 16, it is extruded from the opening 12d, whereas resin flows to a passage 15c below the branch protrusion 16, it is extruded from the opening 12c.

Since the magnitude of the opening 12d varies with time, the valve mechanism 14 controls flow rate of resin flowing to the opening 12d. Specifically, an actuator 19 is mounted to the stationary die 2, and comprises a reciprocative rod or valve 19a. The rod 19a is slidably engaged in a groove with a rectangular section formed in the stationary die 2. In the maximally protruding state, the rod 19a has a front end abutting on the branch protrusion 16 to make the sectional area of the passage 15d zero. The passage 15c communicating with the opening 12c having unchanging shape is not provided with a rod or valve to allow a sectional area to always feed a given amount of resin.

Referring to FIG. 4, the openings 12a, 12b formed in the movable die 3 are connected to the extruders 5a, 5b. The openings 12e, 12e formed through the stationary die 2 and the cover 2a communicate with each other, and are connected to the extruder 5e.

Next, operation of the first embodiment is described. Referring to FIG. 1, the extruders 5a, 5b, 5e feed given amounts of resin, respectively, which are extruded from the openings 12a, 12b, 12e shown in FIGS. 3 and 4. The extruder 5cd feeds a variable amount of resin, which is extruded from the openings 12c, 12d shown in FIGS. 3 and 4. The shapes of the openings 12a, 12b, 12e, 12c do not vary, whereas the shape of the opening 12d varies with time. Resins extruded from the openings 12a, 12b, 12e, 12c, 12d are connected and integrated with each other after passing over the partitions between the adjacent openings, providing a window molding as a finished product.

Referring to FIG. 2, the openings 12c, 12d are described in detail, since the amounts of resin supplied thereto vary with time. The position of the movable die 3 is vertically controlled to change the sectional area of the opening 12d (which corresponds to the first sequence control). Further, the rotation speed of the gear pump 7 is controlled in accordance with the magnitude of the sectional area of the openings 12c, 12d (which corresponds to the second sequence control), thus adjusting accurately the amount of resin to be supplied to the openings 12c, 12d. The gear pump 7 is higher than the extruder 5cd in proportionality and responsivity of the change in discharge amount, allowing the following with respect to an abrupt feed change of resin. Still further, the rotation speed of the extruder 5cd is controlled in synchronism with the control of the rotation speed of the gear pump 7 (which corresponds to the third sequence control). Then, if the timing of starting/stopping the extruder 5cd is advanced, stable control can be achieved with less pressure variations at the inlet of the gear pump 7. Furthermore, the rotation speed of the extruder 5cd is controlled to maintain roughly constant the pressure indicated by the resin pressure gauge 13 at the inlet of the gear pump 7 (which corresponds to the feedback control). With this, the extruder 5cd can feed an amount of resin corresponding to the discharge amount of the gear pump 7. When having greater time lag of supply of resin from the extruder 5cd and greater rate of change of the sectional area of the opening 12d, difficult following of the rotation speed of the extruder 5cd may occur. Such inconvenience can be removed by applying the third sequence control and the feedback control in combination.

Referring to FIG. 4, the rotation speed of the gear pump 7 varies in accordance with the change in sectional area of the openings 12c, 12d, reducing successively the amount of resin fed from the gear pump 7 to the stationary die 2. Then, the sectional area of the opening 12d is successively reduced to finally come to zero. However, since the sectional area of the opening 12c does not vary, the flow rate of resin should be controlled by the valve mechanism 14 shown in FIG. 4. Referring to FIG. 5A, when the movable die 3 is situated at the uppermost position to provide the maximum sectional area of the opening 12d, the amount of protrusion of the valve 19a into the passage 15d is zero, i.e. the passage 15d is not closed at all by the valve 19a, providing the maximum sectional area of the passage 15d. Referring to FIG. 5B, when the movable die 3 is situated at the middle position to provide the medium sectional area of the opening 12d, the amount of protrusion of the valve 19a into the passage 15d is medium, i.e. the passage 15d is closed roughly half by the valve 19a, providing the roughly half sectional area of the passage 15d. Referring to FIG. 5C, when the movable die 3 is situated at the lowermost position to provide the minimum or zero sectional area of the opening 12d, the amount of protrusion of the valve 19a into the passage 15d is maximum, i.e. the passage 15d is fully closed by the valve 19a, providing the zero sectional area of the passage 15d, allowing no resin to flow. Even when the movable die 3 is as shown in FIG. 5C, a given amount of resin always flows through the passage 15c, having no stop of resin flow in FIG. 2.

TABLE 1

|  | Ex-truder (rpm) | Gear pump (rpm) | Discharge amount (Kg/hr) | Required time for change (sec) | Press. variations (gear-pump inlet) (%) | Discharge error (%) |
|---|---|---|---|---|---|---|
| Present invention | 30 ↓ 60 | 10 ↓ 20 | 12 ↓ 24 | 10 | ±5 | ±0.5 |
| Related art | 30 ↓ 60 | 10 ↓ 20 | 12 ↓ 24 | 180 | ±10 | ±10 |

Figure 7A:
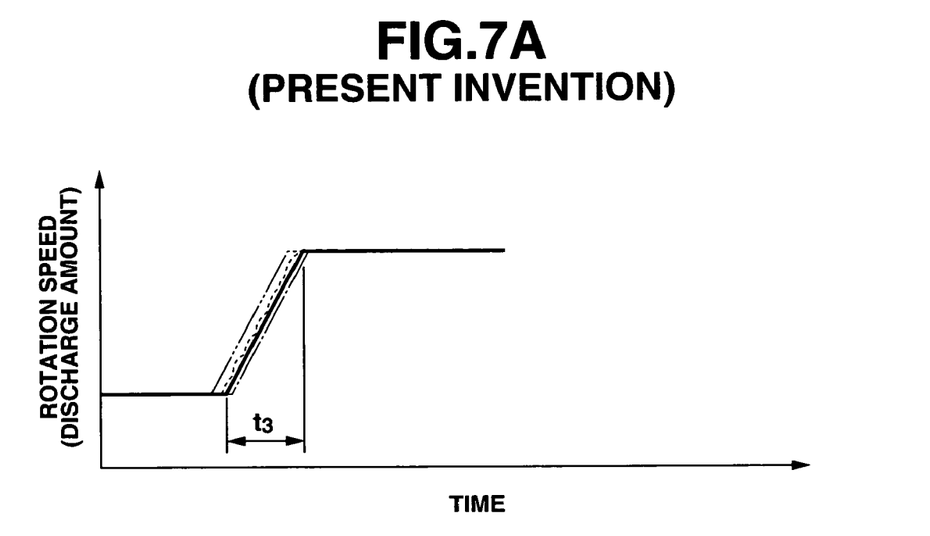
FIGS. 7A and 7B are graphs illustrating the change in discharge amount of resin out of a die opening.
Figure 7B:
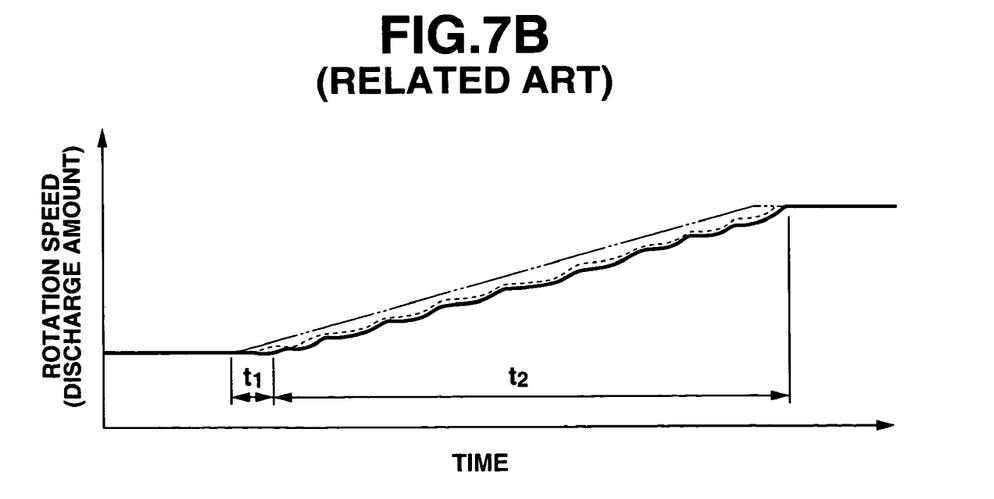

Referring to FIGS. 7A and 7B and Table 1, comparison of the change in discharge amount of resin is described between the present invention and the related art (JP-B2 6-55415). Referring to FIGS. 7A and 7B, two-dot chain line shows a rotation-speed program of the extruder, broken line shows an amount of resin supplied from the extruder, one-dot chain line shows a rotation-speed program of the gear pump, and solid line shows an actual amount of resin discharged from the gear pump. Time required for the amount of resin supplied from the extruder from start of change to completion thereof is longer, i.e. $t_2$ in the related art, as shown in FIG. 7B, whereas it is shorter, i.e. t3 as shown in FIG. 7A in the present invention. Further, as seen from Table 1, an error of the discharge amount of the extruder is greater, i.e. ±10% in the related art, whereas it is smaller, i.e. ±0.5% in the present invention. Furthermore, a time lag of $t_1$ is produced at the timing of starting the change in discharge amount in the related art, whereas no time lag is produced in the present invention.

Figure 8:
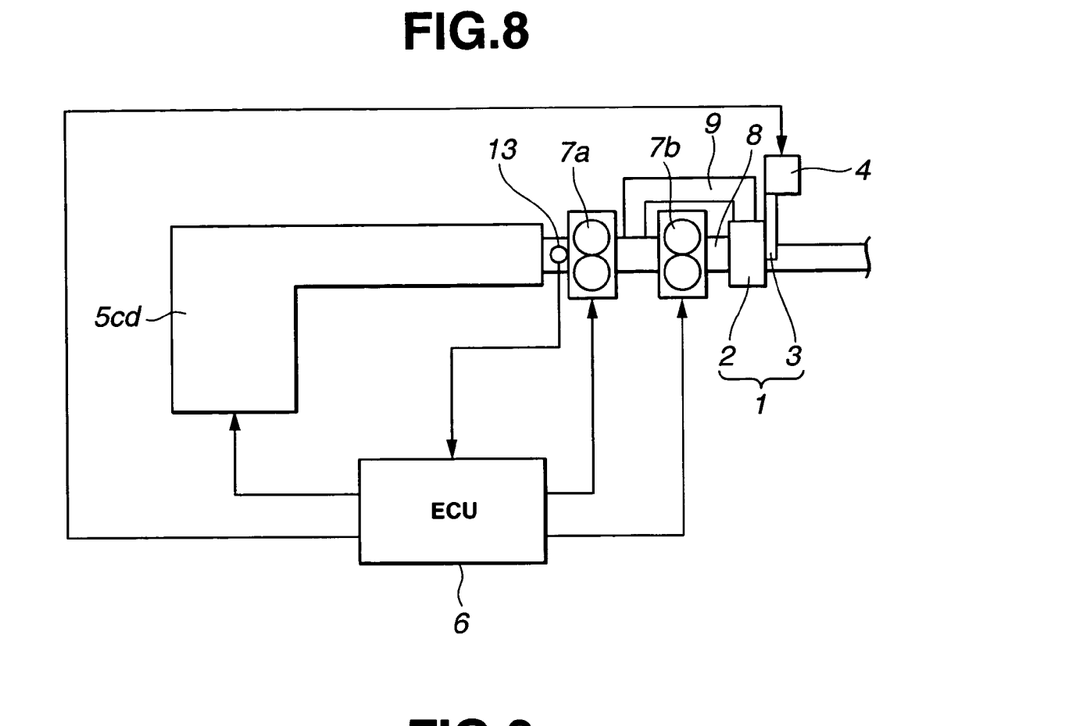
FIG. 8 is a view similar to FIG. 2, showing a second embodiment of the present invention.

Referring to FIG. 8, there is shown second embodiment of the present invention which is substantially the same as the first embodiment except that two gear pumps are arranged. Specifically, the system comprises first and second gear pumps 7a, 7b connected in series, a main feed passage 8 for connecting the first and second gear pumps 7a, 7b, the main feed passage 8 being connected to the stationary die 2, and a bypass passage 9 for connecting a midpoint of the main feed passage 8 between the first and second gear pumps 7a, 7b to the stationary die 2. Then, the passage for feeding resin to the stationary die 2 includes two portions, i.e. main feed passage 8 connected to the opening 12c having unvariable sectional shape and bypass passage 9 connected to the opening 12d having variable sectional shape. Since the passage is already branched off, there is arranged no branch part 16, nor valve mechanism 14 shown in FIG. 4.

Due to such structure, the first gear pump 7a feeds resin measuring a total amount of resin to be supplied to both the openings 12c, 12d, whereas the second gear pump 7b feeds resin measuring a required amount of resin to be supplied to the opening 12c. Thus, the amount of resin supplied to the bypass passage 9 is equal to (discharge amount of the first gear pump 7a—discharge amount of the second gear pump 7b), allowing the bypass passage 9 to provide the amount of resin required to the opening 12d, resulting in accurate supply of the amounts of resin required to the respective openings 12c, 12d. Resin supplied to the opening 12c having unvariable sectional shape passes through the two gear pumps 7a, 7b, and thus undergoes less pressure variations due to discharge variations of the extruder 5cd, resulting in further enhancement in extrusion accuracy. This effect is particularly active on the glass opening C of the window molding which needs highest accuracy.

A description about other structures and operation is omitted, since they are the same as those in the first embodiment.

In the second embodiment, the two gear pumps are connected in series. Optionally, three or more gear pumps may be connected in series. This variation is effective when arranging three or more openings with unvariable or variable sectional shape.

Figure 9:
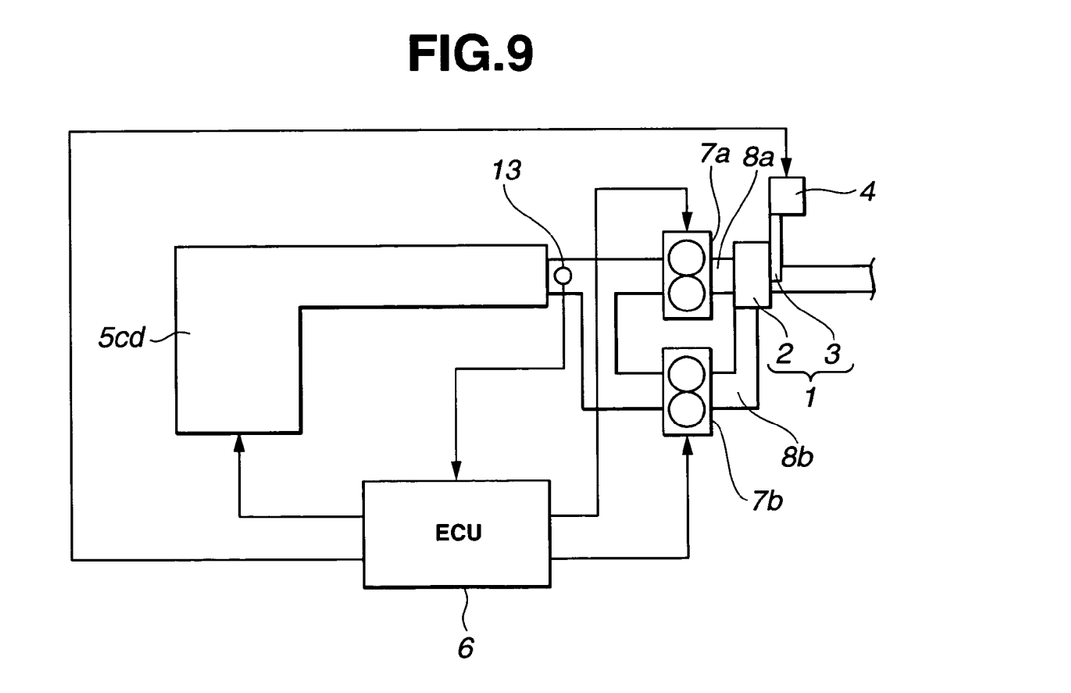
FIG. 9 is a view similar to FIG. 8, showing a third embodiment of the present invention.

Referring to FIG. 9, there is shown third embodiment of the present invention which is substantially the same as the first embodiment except that two gear pumps are arranged. Specifically, the system comprises first and second gear pumps 7a, 7b connected in parallel and main feed passages 8a, 8b connected to the openings 12c, 12d, respectively.

By way of example, when the sectional shape of the opening 12d varies, but does not disappear completely to make the sectional area zero, the first and second gear pumps 7a, 7b can be connected in parallel. In the third embodiment, the amounts of resin supplied to the openings 12c, 12d can directly be controlled by the rotation speed of the gear pumps 7a, 7b, resulting in easy achievement of setting and fine adjustment of the program as compared with serial connection of the gear pumps 7a, 7b.

When two or more portions of a molding formed of the same material need discharge amounts of resin changed in different timings and variations, the third embodiment provides effective means due to its easy achievement of the accuracy.

A description about other structures and operation is omitted, since they are the same as those in the first embodiment.

In the third embodiment, the two gear pumps are connected in parallel. Optionally, three or more gear pumps may be connected in parallel. This variation is effective when arranging three or more openings with unvariable or variable sectional shape. Further, when arranging three or more openings with unvariable or variable sectional shape, there can be arranged gear pumps connected in series and gear pumps connected in parallel. Furthermore, in the illustrative embodiments, the sectional area of the opening 12d can become zero. Optionally, it may not become zero. Still further, the material of the molding may be anything which can be extruded.

As described above, according to the present invention, since the rotation speed of the gear pump is sequence-controlled in synchronism with the change in sectional shape of the second opening, the gear pump can feed an amount of material corresponding to the sectional shape of the first and second openings. Even when the sectional area of the second opening becomes zero, material flows to the first opening with a unvariable sectional shape, resulting in no occurrence of stop of material flow.

Further, the rotation speed of the extruder is sequence-controlled in synchronism with the rotation speed of the gear pump, resulting in excellent responsivity and follow-ability of the extruder.

Still further, the extruder typically has unfavorable responsivity of the change in discharge amount with respect to the change in rotation speed, producing a slight time lag up to the change in feed amount of material. According to the present invention, the timing of changing the rotation speed of the extruder is advanced by predicting the time lag, resulting in enhancement in follow-ability of the feed amount of material and stability of the pressure thereof.

Furthermore, the rotation speed of the extruder is feedback-controlled to maintain roughly constant the pressure at the inlet of the gear pump. Thus, variations in discharge amount of the extruder are absorbed so that the pressure at the inlet of the gear pump becomes equal to a set pressure.

Further, the valve mechanism divides material supplied from the gear pump before reaching the first and second openings so as to conduct further control of the amount of material. Thus, the balance of the amount of material supplied to the first and second openings are adjusted, resulting in enhancement in sectional accuracy of the extrusion.

Still further, part of material resulting from the difference of the discharge amount between the gear pumps flows through the bypass passage, allowing control of the amount of material and thus accurate division of material between the first and second openings, resulting in enhancement in sectional accuracy of the extrusion. As for the first opening connected to the main feed passage, material, after passing through the gear pumps, is supplied to the first opening, resulting in particular enhancement in sectional accuracy of the extrusion.

Furthermore, the amount of material directly supplied from the gear pumps are controlled to allow accurate division of material between the first and second openings, resulting in enhancement in sectional accuracy of the extrusion. Moreover, material can be supplied with different variations and at different timings, facilitating the shape change of the extrusion.

Having described the present invention in connection with the illustrative embodiments, it is noted that the present invention is not limited thereto, and various changes and modifications can be made without departing from the scope of the present invention.

The entire teachings of Japanese Patent Application P2003-89543 filed Mar. 28, 2003 are hereby incorporated by reference.

What is claimed is:

1. A method of controlling an extrusion molding system which comprises a die having an opening including a first part with an unvariable shape and a second part with a variable shape, an extruder which feeds a material to the die, a first gear pump arranged between the die and the extruder, a branch part arranged upstream of the first and second parts of the opening of the die which divides the die into a first passage connected with the first part of the opening for supplying the material and a second passage connected with the second part of the opening for supplying the material, and a valve mechanism arranged in the second passage, wherein the valve mechanism adjusts a flow rate of the second passage, and being arranged to fully close the second passage when the second part is fully closed, the method comprising:

conducting a first sequence control to change the shape of the second part of the opening;

conducting a second sequence control to change a rotation speed of the first gear pump in synchronism with the change in the shape of the second part of the opening; and conducting a third sequence control to open and close the valve mechanism within a width of the second passage to control an amount of the material to be supplied to the first and second passages such that the amount the valve mechanism is open in the second passage is directly proportional to the cross section of the second part of the opening achieved in said conducting a first sequence control.

2. The method as claimed in claim 1, further comprising:
conducting a fourth sequence control to change a rotation speed of the extruder in synchronism with the change in the rotation speed of the first gear pump.

3. The method as claimed in claim 2, wherein the fourth sequence control is conducted such that a timing of starting and stopping the change in the rotation speed of the extruder is advanced with respect to a timing of starting and stopping the change in the rotation speed of the first gear pump.

4. The method as claimed in claim 1, wherein the system further comprises a pressure sensor arranged at an inlet of the first gear pump,
the method further comprising:
conducting a feedback control to maintain substantially constant a pressure indicated by the pressure sensor.

5. The method as claimed in claim 1, wherein the valve mechanism comprises a rod; and wherein a movement of the rod in the second passage varies from a zero protrusion amount to a maximum protrusion amount.

6. The method as claimed in claim 1, wherein the material is thermoplastic elastomer.

7. The method as claimed in claim 6, wherein the material is thermoplastic olefin or styrenic block copolymers.

8. The method as claimed in claim 1, wherein the valve mechanism adjusts a flow rate of the second passage such that the second part of the opening is varied from a maximum cross section when the second passage is fully opened to a zero cross section when the second passage is fully closed.

* * * * *